United States Patent
Huonker

(10) Patent No.: US 9,744,622 B2
(45) Date of Patent: Aug. 29, 2017

(54) MOVING A LASER PROCESSING HEAD RELATIVE TO A CLAMPING CLAW

(71) Applicant: TRUMPF Laser GmbH, Schramberg (DE)

(72) Inventor: Martin Huonker, Dietingen (DE)

(73) Assignee: TRUMPF LASER GMBH, Schramberg (DE)

( * ) Notice: Subject to any disclaimer, the term of this patent is extended or adjusted under 35 U.S.C. 154(b) by 343 days.

(21) Appl. No.: 14/461,550

(22) Filed: Aug. 18, 2014

(65) Prior Publication Data

US 2014/0353293 A1 Dec. 4, 2014

Related U.S. Application Data

(63) Continuation of application No. PCT/EP2013/000418, filed on Feb. 13, 2013.

(30) Foreign Application Priority Data

Feb. 16, 2012 (DE) ........................ 10 2012 202 330

(51) Int. Cl.
*B23K 26/12* (2014.01)
*B23K 26/20* (2014.01)
*B23K 26/035* (2014.01)

(52) U.S. Cl.
CPC .......... *B23K 26/128* (2013.01); *B23K 26/037* (2015.10); *B23K 26/127* (2013.01); *B23K 26/20* (2013.01)

(58) Field of Classification Search
None
See application file for complete search history.

(56) References Cited

U.S. PATENT DOCUMENTS

| 3,136,882 A | * | 6/1964 | Radtke | B23K 15/06 164/DIG. 5 |
| 3,806,693 A | * | 4/1974 | Miller | B23K 15/04 219/121.13 |
| 4,031,351 A | * | 6/1977 | Martin | B23K 26/12 219/121.67 |
| 4,080,526 A | * | 3/1978 | Kihara | H01J 37/301 219/121.21 |

(Continued)

FOREIGN PATENT DOCUMENTS

CN 200957492 Y 10/2007
CN 101817119 A 9/2010

(Continued)

OTHER PUBLICATIONS

International Search Report from corresponding PCT Application No. PCT/EP2013/000418, dated Jul. 2, 2013, 6 pages.

*Primary Examiner* — David Angwin
*Assistant Examiner* — John J Norton
(74) *Attorney, Agent, or Firm* — Fish & Richardson P.C.

(57) ABSTRACT

A laser processing device for processing workpieces such as by welding includes a laser processing head and a workpiece clamping claw defining an opening through which the laser beam is focused on the workpiece. Each of the laser processing head and the clamping claw have respective shielding portions and movable relative to each other to selectively form a light-tight housing about a portion of the beam extending between the laser head and the clamping claw.

21 Claims, 3 Drawing Sheets

(56) References Cited

U.S. PATENT DOCUMENTS

| | | | | |
|---|---|---|---|---|
| 4,128,753 A | * | 12/1978 | Sharp | B23K 26/24 |
| | | | | 219/121.63 |
| 4,406,940 A | | 9/1983 | Tsutsumi | |
| 4,709,133 A | * | 11/1987 | Mainville | B23K 9/025 |
| | | | | 219/125.1 |
| 4,711,985 A | | 12/1987 | Wilkerson | |
| 4,950,268 A | * | 8/1990 | Rink | A61B 18/20 |
| | | | | 219/121.2 |
| 5,061,839 A | * | 10/1991 | Matsuno | B23K 26/1476 |
| | | | | 219/121.75 |
| 5,120,926 A | * | 6/1992 | Marriott | B23K 26/0648 |
| | | | | 219/121.67 |
| 5,274,212 A | * | 12/1993 | Campbell | B23K 26/12 |
| | | | | 219/121.63 |
| 5,334,816 A | * | 8/1994 | Sugiyama | B23K 26/032 |
| | | | | 219/121.75 |
| 6,737,660 B2 | * | 5/2004 | Miura | H01J 37/18 |
| | | | | 219/121.22 |
| 8,829,388 B2 | * | 9/2014 | Samartsev | B23K 26/023 |
| | | | | 219/121.63 |
| 2005/0092817 A1 | * | 5/2005 | Baumann | B23K 20/126 |
| | | | | 228/212 |
| 2005/0173379 A1 | | 8/2005 | Ireland et al. | |
| 2008/0041832 A1 | * | 2/2008 | Sykes | B23K 26/12 |
| | | | | 219/121.84 |
| 2008/0066596 A1 | | 3/2008 | Yamaguchi et al. | |
| 2008/0308538 A1 | * | 12/2008 | Harris | B23K 26/34 |
| | | | | 219/121.84 |

FOREIGN PATENT DOCUMENTS

| | | | | |
|---|---|---|---|---|
| DE | 2352481 | | 5/1974 | |
| DE | 3141881 | C2 | 10/1991 | |
| DE | 29620304 | U1 | 2/1997 | |
| DE | 69809563 | T2 | 9/2003 | |
| DE | 102006002573 | A1 * | 7/2007 | ......... B23K 26/0648 |
| DE | 102008041774 | A1 * | 3/2010 | ........... B23K 26/046 |
| EP | 0453698 | A1 | 10/1991 | |
| EP | 1669159 | A1 | 6/2006 | |
| JP | 09108881 | A | 4/1997 | |
| WO | 2012062308 | A1 | 5/2012 | |
| WO | 2013120606 | A1 | 8/2013 | |

* cited by examiner

MOVING A LASER PROCESSING HEAD RELATIVE TO A CLAMPING CLAW

CROSS REFERENCE TO RELATED APPLICATIONS

This application is a continuation of and claims priority under 35 U.S.C. §120 to PCT Application No. PCT/EP2013/000418 filed on Feb. 13, 2013, which claimed priority to German Application No. 10 2012 202 330.5, filed on Feb. 16, 2012. The contents of both of these priority applications are hereby incorporated by reference in their entirety.

TECHNICAL FIELD

This specification relates to workpiece processing devices, and more particularly to laser processing devices for processing workpieces with laser beams, such for laser welding.

BACKGROUND

A significant cost factor in laser technology is the necessity to shield the operating region so as to be safe with respect to lasers. Conventionally, this is achieved by means of complex protective housings, robot cells, etc.

Moreover, there are laser welding head in which local shielding is produced itself by the laser welding head or components which are arranged thereon. The workpiece is clamped between two (upper and lower) clamping claws associated with the laser welding head or the components arranged thereon, and the laser beam is focused by welding optics onto the workpiece through a clamping claw opening of the upper clamping claw. The welding optics is movably supported in the laser welding head, which in turn is securely fixed to the upper clamping claw.

A funnel-like shaft between the laser welding head and the upper clamping claw acts as a protective housing for the laser beam. In addition, a cross jet is located in the protective housing in order to protect a protective glass pane which is located in front of the welding optics from splashes during the laser welding operation. The laser welding head and the upper clamping claw therefore form a unit which has to be disassembled, for example, in order to clean or replace the upper clamping claw. However, it is particularly disadvantageous in this construction that the clamping of the workpiece has to be carried out again for each welding portion since the clamping claw is directly coupled to the optics. This process is not only time-intensive but leads to positioning actions of the clamping claw and the optics outside a predetermined tolerance, in particular in conjunction with a robot—which in comparison is instead intended to be considered to be soft with respect to the rigidity—as a handling medium of the optics owing to limited positioning precision levels and/or other error sources.

The higher weight of the laser processing head as a result of the construction when the upper clamping claw is integrated exacerbates this problem or requires greater efforts to ensure the positioning precision. In addition, owing to the upper clamping claw which is secured to the optics as a protective housing, the spacing between the optics and workpiece is predetermined in the laser-safe state. If a focal point is intended to be changed with respect to the workpiece surface, this is intended to be solved by means of a focal point adjustment which is internal with respect to the optical unit and which is intended to be provided in the laser processing head. This also results in a comparatively increased weight with the disadvantages which have been described above.

SUMMARY

One aspect of the invention features a laser processing device with a laser processing head having a processing optics for focusing a laser beam on a workpiece, a clamping claw for clamping the workpiece and having a clamping claw opening through which the laser beam can be focused on the workpiece, and a laser-tight housing which shields the laser beam extending between the processing optics and the clamping claw during laser processing to the outside.

The laser processing head and the clamping claw are two separate components which each have a shielding portion and which can be moved relative to each other in such a manner that the two shielding portions complement each other to form the laser-tight housing.

The clamping claw may define the clamping claw opening by means of a recess which is provided in a monolithic construction. or also by forming the clamping claw as a plurality of clamping claw elements. In addition to this (upper) clamping claw with the clamping claw opening, clamping of a workpiece to be processed can be carried out by the use of a second (lower) clamping claw without a counter-support. The clamping claw arrangement is intended to be constructed so as to be light-tight to laser light ("laser-safe") or to be shielded in an appropriate manner.

In some implementations, the laser processing head and the clamping claw are two separate components which can be moved relative to each other. After the workpiece has been clamped, for example, between the upper and the lower clamping claw, the laser processing head is lowered onto the upper clamping claw until the two shielding portions together form the laser-tight housing.

The term "shielding portions" is generally intended to be understood to refer to devices which, in terms of their arrangement on the laser processing head or on the clamping claw, peripherally surround the laser beam over a length in the propagation direction.

In a particular example, even with an housing which is constructed laser-tight, the laser processing head and the clamping claw can be moved relative to each other in the longitudinal and/or transverse direction so that the laser beam, owing to a relative movement of the laser processing head and clamping claw in the longitudinal direction, focuses on the workpiece and, owing to a relative movement in the transverse direction, a desired processing path, e.g., a welding path, can be traversed on the workpiece. The clamping claw shielding portion is constructed so as to be so large with respect to the inner diameter or inner contour that the laser beam can travel the provided welding path (conventionally a linear or undulating closing seam which is a few millimeters long, a circular path or a C-shaped path ("bracket")), without striking the inner wall of the shielding portion. This shielding integrated into the upper clamping claw can make a complex protective housing superfluous and provide a cost-effective solution. The upper clamping claw as a separate component can be readily cleaned and replaced.

In a preferred embodiment, the two shielding portions are constructed in a tubular manner, in particular as a rigid shielding pipe or as a shielding pipe which is flexible in the longitudinal and/or transverse direction thereof (shielding hose or bellows). In order to form the light-tight housing, the two shielding portions can engage one inside the other or be in abutment with each other with the ends thereof which face each other. After the workpiece has been clamped, the laser processing head is lowered onto the upper clamping claw until the two shielding pipes engage one inside the other or are in light-tight abutment with each other with the pipe ends thereof in order to thus form the light-tight housing which is required for the laser processing operation, and to surround the focused laser beam over the entire length thereof. In the case of shielding pipes which engage one inside the other, the clamping claw shielding pipe preferably protrudes into the laser processing head shielding pipe.

In an advantageous development of this embodiment, the ends of the two shielding portions which engage one inside the other can be displaced transversely relative to each other. To this end, the outer diameter of the engaging shielding portion is accordingly smaller than the inner diameter of the other shielding portion so that between the two ends which engage one inside the other there is sufficient play for the transverse displacement. In another advantageous development, the ends of the two shielding portions which are in abutment with each other are retained one on the other in a magnetic or pneumatic manner.

During the laser processing operation, laser radiation reflected from the processing process, as well as the process light, can be laterally shielded with the most compact structure possible, and it is advantageous for the opening of the clamping claw shielding pipe to taper in a conical manner in the direction towards the clamping claw opening, that is to say, to form a shielding funnel which consequently adapts to the beam shape. In addition to the beam form, the beam guide can be also intended to be taken into consideration so that, for example, when the laser processing head is tilted, a clamping claw shielding pipe may first opens in a conical manner towards the clamping claw opening before it tapers in a conical manner. The required geometry of the beam shielding is in this instance not necessarily formed by the clamping claw shielding pipe alone but may also result from the cooperation with the shielding pipe of the laser processing head. Since the shielding is more effective, the more the two shielding pipes engage one inside the other, the pipe length of the clamping claw shielding pipe is preferably at least approximately 50 mm, preferably at least approximately 100 mm, in order to be able to provide a corresponding overlapping region and, during the laser processing operation, one shielding pipe preferably protrudes at least approximately 20 mm, more preferably at least approximately 50 mm, into the other shielding pipe. Using the overlap, different focal points can be adjusted by means of simple movement of the laser processing head along the overlap.

Preferably, at least one of the two shielding portions has a flexible sealing element which is in light-tight abutment with the other shielding portion when the housing is constructed. The flexible shielding element may, for example, be formed by an annular foam piece or by an annular protective brush having flexible bristles. Flexible sealing elements to some degree provide a capacity for adaptation to different shape and/or size configurations of the shielding pipes. Alternatively, one of the shielding pipes which engage one inside the other may be variable in terms of the diameter thereof so that the shielding pipes in the overlap region are in light-tight abutment at least over a portion and consequently form a circumferentially (almost) continuous contact region. To this end, for example, one of the shielding pipes may apply an attraction force (magnetic force, suction) to the other shielding pipe. Owing to the effect of such force, the diameter of the shielding pipe which is subjected to this force expands, as can be produced, inter alia, by means of a resilient construction. The term "resilient" in this context is not limited to a material property, but instead may also constitute a structurally determined property (e.g., an overlap portion on the shielding pipe which can be "opened"). Preferably, at least one of the contact faces of the contact region of the shielding pipes has resilient deformability, which ensures or at least improves the abutment of the contact faces, in particular with respect to the light tightness of the contact region. These also include flexible sealing elements. The clamping claw shielding pipe may also itself be constructed so as to be able to be varied in terms of geometry or so as to be movable in the beam propagation direction—at least over a portion—and may then be redirected by the shielding pipe of the laser processing head. Possible embodiments are undulating sheet metal pipes, telescopic extensions, etc.

In some variants, the shielding pipes are formed in a conical manner in order to form, even with different diameters, simply by means of moving one inside the other, a light-tight/laser-safe region. In this instance, when different diameters are used, the resulting focal point displacement should be taken into account in relation to the workpiece and, if not intentional, be corrected. If it is possible to establish between the shielding pipes a retention force which fixes the position of the shielding pipes with respect to each other (for example, magnetically or pneumatically), and if the clamping claw shielding pipe is constructed so as to be variable in terms of geometry or movable, the laser processing head can thus assume a large number of relative positions with respect to the clamping claw opening in accordance with the application to be carried out and/or move into them.

In addition to the mutual engagement of the shielding pipes, laser-safe shielding by means of the peripheral light-tight abutment of the end faces of the shielding pipes is also possible. The ensuring of the connection of both shielding pipes during the process time can be carried out mechanically, but preferably by means of a retention force, in particular magnetically or pneumatically ("suction"). This principle can also be carried out in an embodiment with shielding pipes which engage one inside the other, with the end faces of the shielding pipes in this instance not being in abutment with each other, but with at least one of the shielding pipes being in abutment, at the end face and/or at a shoulder which is provided for this purpose, with a shoulder of the second shielding pipe. When a clamping claw shielding pipe is used which is variable in terms of geometry or which is movable, it can be guided by means of the overlap region formed by the mutual engagement so that the retention force which is required for abutment can be reduced.

Preferably, the shielding pipes or hoses are produced from absorbent material or covered or coated with an absorbent material at least over the (inner) face which surrounds the laser beam in the propagation direction.

In order to protect the processing optics from welding splashes, one of the two shielding portions can have a cross jet which blows through the focused laser beam in the respective shielding portion transversely relative to the pipe axis. In order to minimize the compressed air consumption, the cross jet may be operated where possible only as long as the corresponding location is welded. With an arrangement in the clamping claw shielding pipe, the cross jet is advantageously fitted approximately from 30 to 50 mm above the focal plane. The advantage of such a cross jet which is so close to the focal point is that the laser beam close to the focal point has a smaller cross-section than close to the optical processing unit and a correspondingly shorter cross jet nozzle can consequently be used. Furthermore, with a cross jet which is close to the focal point, a metal vapor plume which occurs in particular during welding with large focal lengths can be prevented in a very effective manner.

A proximity switch is preferably incorporated into a safety circuit of a laser which produces the laser beam. The proximity switch permits the switching-on of the laser beam only when the two shielding portions are connected to each other in a light-tight manner.

A sensor may also be incorporated in the safety circuit of the laser to verify the presence of a workpiece clamped between the clamping claws, and which permits the switching-on of the laser beam only when a workpiece is clamped.

Since through-welding also constitutes a possible safety problem, in the case of a second clamping claw it preferably has a temperature sensor incorporated into the safety circuit of the laser, and which switches off the laser beam in the event of excessive heating of the second clamping claw, as could occur, for example, with uncontrolled through-welding of the workpiece.

Furthermore, at least one photo detector may be incorporated into the safety circuit of the laser and adapted to the laser wavelength and which, in the case of detection of laser radiation released in an uncontrolled manner, switches off the laser beam.

A development of the laser processing device makes provision, for forming a plurality of weld beads located close to each other, for the use of a shielding structure of a plurality of pipe openings or shielding funnels which are arranged beside each other and which may optionally also overlap with each other. Owing to this measure, a plurality of individual welding operations can be carried out in the context of a displacement of the laser processing head without repositioning the laser processing head, when additional clamping locations are intended to be provided therebetween and in the case of a welding optics arranged in a fixed manner in the laser processing head, for example, by tilting the laser processing head or in the case of processing optics (for example, an optical scanner unit) movably supported in the laser processing head, by moving the processing optics or in the case of an optical scanner unit by moving the scanner mirrors.

Other advantages of the invention will be appreciated from the claims, the description and the drawings. The features mentioned above and those set out below may also be used individually per se or together in any combination. The embodiments shown and described are not intended to be understood to be a conclusive listing but are instead of exemplary character for describing the invention.

DETAILED DESCRIPTION

Figure 1:
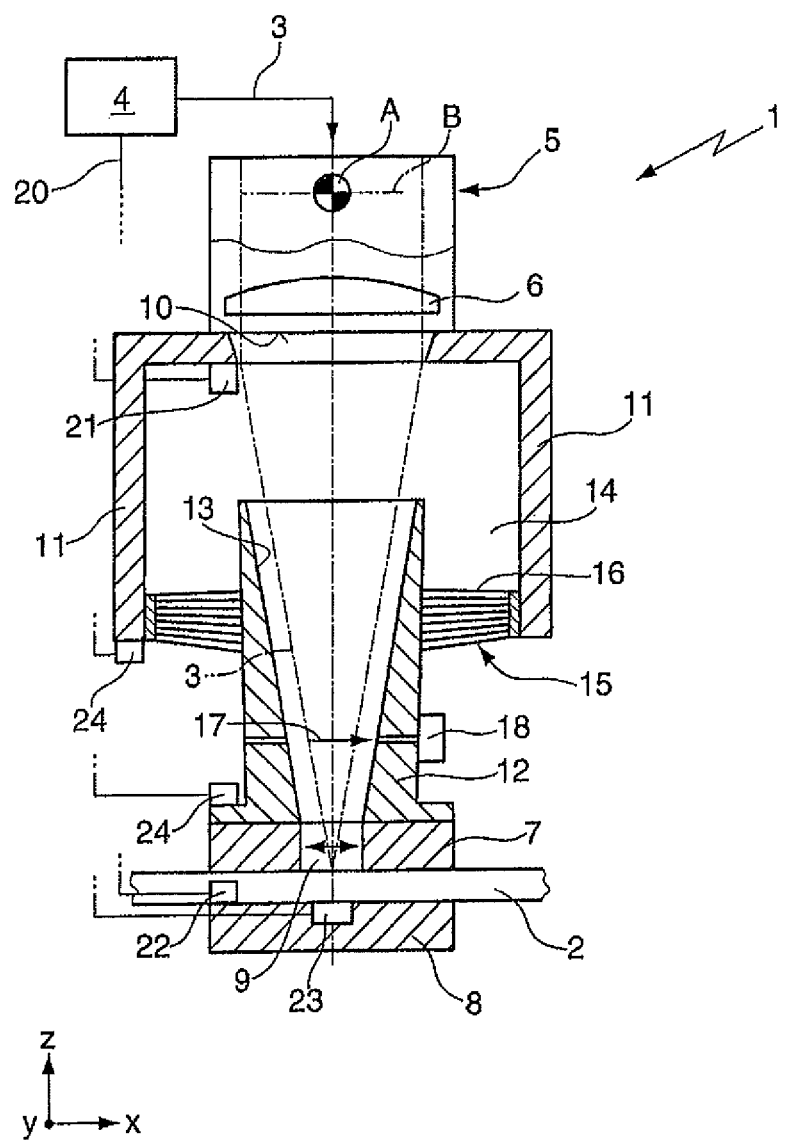
FIG. 1 shows a first example of a laser welding device having two rigid shielding pipes which engage one inside the other to form a housing for the laser beam.

Device 1, e.g., a laser welding device, shown in FIG. 1 serves to laser weld a workpiece 2 by means of a laser beam 3, in particular in the field of bodywork.

The laser welding device 1 includes a laser 4 for producing the laser beam 3, a laser welding head 5 having a welding optics 6 for focusing the laser beam 3 onto the workpiece 2, and a clamping device having an upper and a lower clamping claw 7, 8 between which the workpiece 2 is clamped. The laser beam 3 is focused on the workpiece 2 through a clamping claw opening 9 of the upper clamping claw 7. The laser welding head 5 can be freely moved in space relative to the clamping claws 7, 8, that is to say, for example, displaceable in the main axes X, Y, Z and is supported so as to be able to be tilted about the axes A, B.

The laser welding head 5 is extended downwards at the laser beam output side 10, that is to say, in FIG. 1 at the lower side thereof, by means of a rigid shielding pipe 11 which completely surrounds the output laser beam 3, and the upper clamping claw 7 is extended in an upward direction at the side thereof remote from the workpiece 2, that is to say, in FIG. 1 at the upper side thereof, by a rigid shielding pipe 12 which adjoins the clamping claw opening 9. The outer diameter of the clamping claw shielding pipe 12 is smaller than the inner diameter of the laser welding head shielding pipe ("shielding bell") 11 so that, at least during the laser welding operation, the clamping claw shielding pipe 12 can protrude into the laser welding head shielding pipe 11. As shown in FIG. 1, a pipe opening 13 of the clamping claw shielding pipe 12 may continuously taper in a conical or funnel-like manner in the direction towards the clamping claw opening 9 in accordance with the focused laser beam 3. The clamping claw shielding pipe 12 is preferably at least approximately 100 mm long and protrudes during the laser welding operation by at least approximately 50 mm into the laser welding head shielding pipe 11. The protective action of the shielding pipes 11, 12 which protrude one inside the other is greater the larger the overlap is selected to be. Alternatively, the two shielding pipes 11, 12 could also be constructed to be flexible, that is to say, as a shielding hose.

For light-tight sealing of the annular gap 14 which is present between the two shielding pipes 11, 12 which protrude one inside the other, there is provided at the inner side of the laser welding head shielding pipe 11 a flexible sealing element 15 in the form of an annular protective brush, whose inwardly directed radial bristles 16 are in abutment with the clamping claw shielding pipe 12. The flexible sealing element 15 ensures, in spite of the relative movement between the two shielding pipes 11, 12 as required to produce a local welding contour, a light-tight sealing so that at least no directed laser radiation with considerable power density can be output.

In order to protect the welding optics 6 from welding splashes, a compressed air cross jet 17 is provided in the clamping claw shielding pipe 12, preferably approximately from 30 to 50 mm above the focal plane. The cross jet 17 blows transversely relative to the pipe axis of the clamping claw shielding pipe 12 through the focused laser beam 3 into a casing 18 which is fitted to the clamping claw shielding pipe 12 and which either has a suction action or a labyrinth-like air flow guide, through which the cross jet gas can be directed outwards with little pressure loss and at the same time radiation originating from the process cannot be discharged outwards through the labyrinth structure, or only very weakly. The cross jet 17 is where possible operated only for as long as welding is carried out at the corresponding location. Since the laser beam 3 close to the focal point has a smaller cross-section than close to the welding optics 6, a correspondingly shorter cross jet nozzle can be used. On the one hand, the compressed air consumption is thereby reduced and, on the other hand, a metal vapor plume that otherwise occurs during welding with long focal distances can be very effectively prevented. Alternatively, it is also possible to arrange the cross jet 17 in the laser welding head shielding pipe 11 and consequently close to the welding optics 6.

In order to laser weld a workpiece 2, the workpiece 2 is first clamped between the clamping claws 7, 8 in such a manner that the welding figure which is intended to be welded is located inside the clamping claw opening 9. Subsequently, the laser welding head 5 is moved forwards and lowered with the laser welding head shielding pipe 11 thereof onto the clamping claw shielding pipe 12 until the clamping claw shielding pipe 12 protrudes by approximately 50 mm into the laser welding head shielding pipe 11. After the cross jet 17 has been switched on, the laser beam 3 is switched on and is then redirected in order to form the desired welding figure on the workpiece 2, in the case of a welding optics 6 which is arranged in a fixed manner in the laser welding head 5, by moving or tilting the entire laser welding head 5 or, in the case of a welding optics 6 which is movably supported in the laser welding head 5 (for example, an optical scanner unit), by moving only the welding optics 6.

In the laser welding head shielding pipe 11, there is arranged a proximity switch 21 which is incorporated in a safety circuit 20 of the laser 4 and which permits the switching-on of the laser beam 3 only when the clamping claw shielding pipe 12 protrudes to a sufficient extent into the laser welding head shielding pipe 11.

In the safety circuit 20 of the laser 4, there is further incorporated a sensor 22 which is arranged on the lower clamping claw 7 and which verifies the presence of a workpiece 2 which is clamped between the clamping claws 7, 8 and which permits the switching-on of the laser beam 3 only when a workpiece 2 is actually clamped.

Since through-welding also constitutes a potential safety problem, the lower clamping claw 8 preferably includes a component which is as solid as possible, with a temperature sensor 23 incorporated into the safety circuit 20 of the laser 4 and which switches off the laser beam 3 when the lower clamping claw 8 exceeds a predetermined temperature.

In the safety circuit 20 of the laser 4 there is finally also incorporated at least one photo detector 24 adapted to the laser wavelength and which, in the event of detection of laser radiation which is released in an uncontrolled manner, switches off the laser beam 3. As shown in FIG. 1, the photo detector 24 may, for example, be arranged on the laser welding head shielding pipe 11 below the flexible sealing element 15 or on the upper clamping claw 7.

Figure 2:
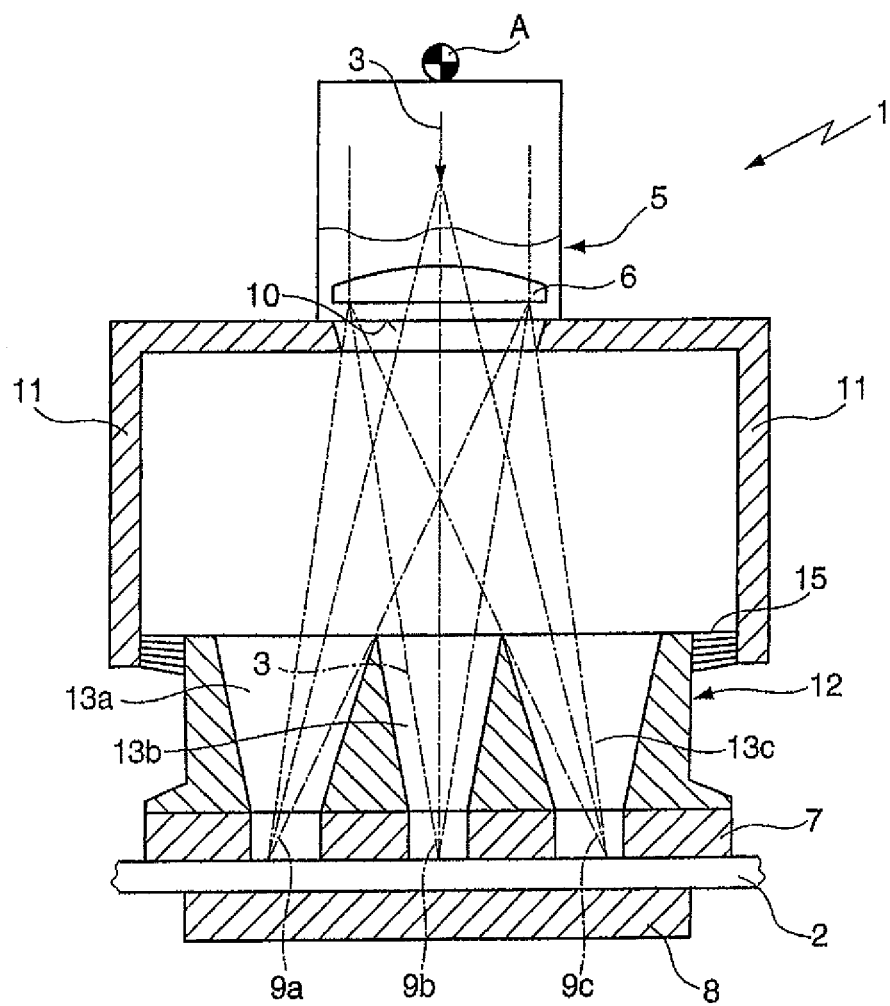
FIG. 2 shows a modification of the example of FIG. 1.

The laser welding device 1 shown in FIG. 2 differs from the laser welding device of FIG. 1 only in that, in this instance, the clamping claw shielding pipe 12 has three pipe openings 13a-13c which are arranged beside each other without lateral overlap and which each adjoin at the top a clamping claw opening 9a-9c of the upper clamping claw 7. The laser beam 3 is selectively directed into one of the pipe openings 13a-13c which taper in a conical manner in the direction towards the respective clamping claw opening 9a-9c which, in the case of a welding optics 6 which is movably supported in the laser welding head 5, can be carried out by moving only the welding optics 6 or, in the case of an optical scanner unit, by moving the scanner mirrors. In this manner, the laser welding head 5, from one position and without repositioning in the context of a displacement of the laser welding head or the suspension thereof, can carry out a plurality of individual welding operations on the workpiece 2. A cross jet in this instance is preferably arranged in the laser welding head shielding pipe 11. Alternatively, the pipe openings 13a-13c may also overlap in the upper region thereof.

Figure 3:
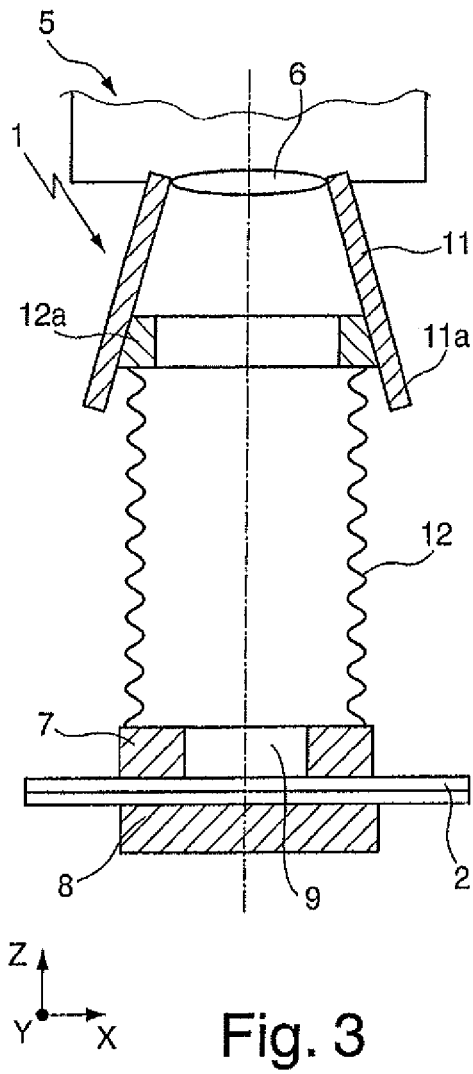
FIG. 3 shows a second example of a laser welding device having a rigid and a flexible shielding pipe together forming a housing for the laser beam.

The laser welding device 1 shown in FIG. 3 differs from the embodiment shown in FIG. 1 in that, in this instance, the lower pipe end 11a of the laser welding head shielding pipe 11 opens in a conical manner in a downward direction at the inner side and in that the clamping claw shielding pipe 12 is constructed in the longitudinal and transverse direction thereof so as to be flexible, that is to say, for example, as a shielding pipe or folding bellows and the upper pipe end 12a thereof tapers in a conical manner upwards at the outer side. The lower pipe end 11a and the upper pipe end 12a have the same conicity. The upper pipe end 12a is formed by an annular permanent magnet, whilst the lower pipe end 11a is formed from a ferromagnetic material. For laser welding a workpiece 2, the laser welding head 5 is lowered with the conical pipe end 11a thereof onto the conical pipe end 12a of the clamping claw shielding pipe 12 in the Z direction until the two conical pipe ends 11a, 12a engage one inside the other and finally are in complete abutment with each other. In this abutment, the two conical pipe ends 11a, 12a are retained by means of the active magnetic force. The conicity of the pipe ends 11a, 12a which are in abutment with each other may already constitute a sufficiently light-tight connection so that flexible sealing elements can be dispensed with. By further lowering the laser welding head 5, the flexible clamping claw shielding pipe 12 can be compressed and consequently the spacing in the Z direction between the processing optics 6 and the workpiece 2 can be shortened, without the two pipe ends 11a, 12a being released from each other and the light-tight connection thereby being opened.

Figure 4:
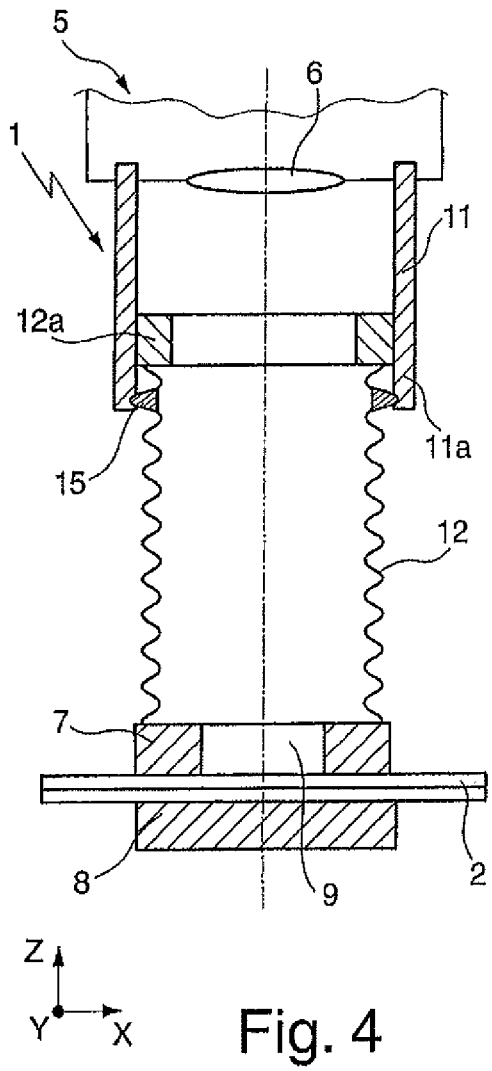
FIG. 4 shows a modification of the second example of FIG. 3.

The laser welding device 1 shown in FIG. 4 differs from the embodiment shown in FIG. 3 in that, in this instance, the pipe ends 11a, 12a are not constructed in a conical manner, but instead the upper pipe end 12a of the clamping claw shielding pipe 12 is guided so as to be able to be longitudinally displaced in the lower pipe end 11a of the laser welding head shielding pipe 11. In order to laser weld a workpiece 2, the laser welding head 5 is lowered with the pipe end 11a thereof in the Z direction towards the pipe end 12a of the clamping claw shielding pipe 12 until the clamping claw shielding pipe 12 has been inserted with the upper pipe end 12a thereof to a sufficient extent into the lower pipe end 11a of the laser welding head shielding pipe 11 and is retained in this position in an appropriate manner, such as, for example, mechanically, magnetically, pneumatically, etcetera. A flexible sealing element 15 which is arranged on the upper pipe end 12a at the outer side in the form of an annular protective brush further seals the two shielding pipes 11, 12 in a light-tight manner with respect to each other. By lowering or raising the laser welding head 5, the length of the flexible clamping claw shielding pipe 12 can be changed and consequently the spacing in the Z direction between the processing optics 6 and workpiece 2 can be adjusted. Owing to the flexible clamping claw shielding pipe 12 and the connection of the two pipe ends 11a, 12a in a manner preventing tilting, by moving the laser welding head 5 in the X-Y direction, X-Y transverse movements between the laser welding head 5 and clamping claw 7 are possible, without the two pipe ends 11a, 12a being released from each other or the light-tight connection being opened.

A number of embodiments of the invention have been described. Nevertheless, it will be understood that various modifications may be made without departing from the spirit and scope of the invention. Accordingly, other embodiments are within the scope of the following claims.

What is claimed is:

1. A laser processing device comprising:
a laser processing head including processing optics for focusing a laser beam onto a workpiece;
a clamping claw system including a first clamping claw and a second clamping claw that are configured to cooperate to clamp the workpiece during laser processing, the first clamping claw defining a clamping claw opening through which the laser beam is focused onto the workpiece; and
a light-tight housing arranged to shield a portion of the laser beam extending between the processing optics and the first clamping claw during laser processing,
wherein the laser processing head and the first clamping claw are two separate components configured to be moved independently from each other, and
wherein the laser processing head and the clamping claw system include respective shielding portions that are configured to be moved relative to each other between a first position in which the respective shielding portions do not complement each other to form the light-tight housing and a second position in which the respective shielding portions complement each other to form the light-tight housing, the shielding portion of the clamping claw system being different from the first clamping claw and adjoining the clamping claw opening.

2. The laser processing device of claim 1, wherein, with the light-tight housing formed, the respective shielding portions of the laser processing head and the clamping claw system are configured to be moved relative to each other while maintaining the light-tight housing.

3. The laser processing device of claim 1, wherein the respective shielding portions are tubular, and at least one of the respective shielding portions is flexible.

4. The laser processing device of claim 1, wherein the respective shielding portions are configured to be positioned with their ends in abutment to form the light-tight housing.

5. The laser processing device of claim 1, wherein the respective shielding portions are configured to be positioned one inside the other to form the light-tight housing.

6. The laser processing device of claim 5, wherein the two shielding portions engage one inside the other by at least approximately 20 millimeters.

7. The laser processing device of claim 5, wherein overlapping ends of the respective shielding portions are configured to be displaced transversely relative to each other.

8. The laser processing device of claim 5, wherein an engaged end of one of the respective shielding portions has an inner surface that tapers in a conical manner in a direction away from the other of the respective shielding portions.

9. The laser processing device of claim 5, wherein an engaged end of one of the respective shielding portions has an outer surface that tapers in a conical manner in a direction away from the other of the respective shielding portions.

10. The laser processing device of claim 1, wherein the shielding portion of the clamping claw system has a length of at least approximately 50 millimeters.

11. The laser processing device of claim 1, wherein the shielding portion of the clamping claw system defines an opening that tapers in a conical manner in a direction towards the clamping claw opening.

12. The laser processing device of claim 1, wherein the respective shielding portions are coupled to each other in a magnetic or pneumatic manner.

13. The laser processing device of claim 1, wherein the shielding portion of the clamping claw system is constructed as a flexible shielding pipe, and wherein the shielding portion of the laser processing head is constructed as a rigid shielding pipe.

14. The laser processing device of claim 1, wherein one of the respective shielding portions comprises a flexible sealing element positioned in light-tight abutment with the other of the respective shielding portions when the light-tight housing is formed.

15. The laser processing device of claim 1, wherein one of the respective shielding portions comprises a cross jet arranged for protection of the processing optics.

16. The laser processing device of claim 1, further comprising a proximity switch operable to permit switching-on of the laser beam in response to the respective shielding portions being in the second position forming the light-tight housing.

17. The laser processing device of claim 1, further comprising a workpiece sensor responsive to a presence of a workpiece clamped by the clamping claw system and disabling switching-on of the laser beam when no workpiece is clamped.

18. The laser processing device of claim 1, wherein the clamping claw is a first clamping claw, the device further comprising a second clamping claw that cooperates with the first clamping claw to clamp the workpiece, where the second clamping claw comprises comprising a temperature sensor responsive to a temperature of the second clamping claw and operable to switch off the laser beam when a predetermined temperature of the second clamping claw is exceeded.

19. The laser processing device of claim 1, further comprising at least one photo detector responsive to a wavelength of the laser beam and configured to switch off the laser beam in response to detection of laser radiation.

20. The laser processing device of claim 1, wherein the shielding portion of the clamping claw system has a plurality of pipe openings arranged besides each other, and the pipe openings at least partially overlap with each other.

21. A laser processing device comprising:
a laser processing head including:
processing optics for focusing a laser beam onto a workpiece, and
a laser processing head shielding portion; and
a clamping claw system including:
a first clamping claw and a second clamping claw configured to cooperate to clamp the workpiece during laser processing, the first clamping claw defining a clamping claw opening through which the laser beam is focused onto the workpiece, and
a clamping claw shielding portion being different from the first clamping claw and adjoining the clamping claw opening,
wherein the laser processing head shielding portion and the clamping claw shielding portion are two separate components configured to be moved with respect to each other between a first position in which the two separate components complement each other to form a light-tight housing arranged to shield a portion of the laser beam extending between the processing optics and the clamping claw system during laser processing, and a second position in which the two separate components do not complement each other to form the light-light housing.

* * * * *